April 3, 1934.  G. N. KELLEY  1,953,235
HITCH DEVICE
Filed Nov. 11, 1932  2 Sheets-Sheet 2
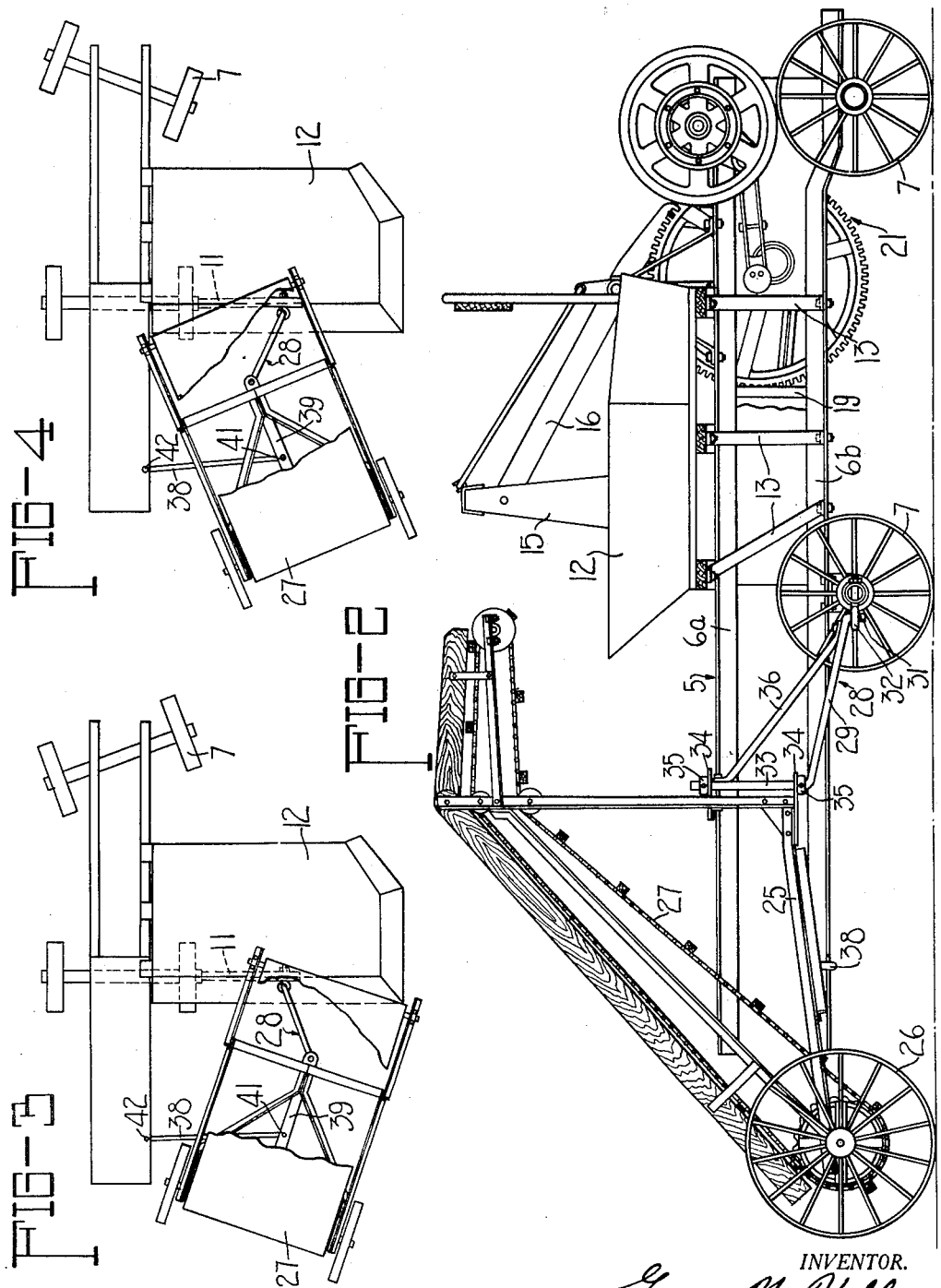
INVENTOR.
George N. Kelley
BY
ATTORNEY.

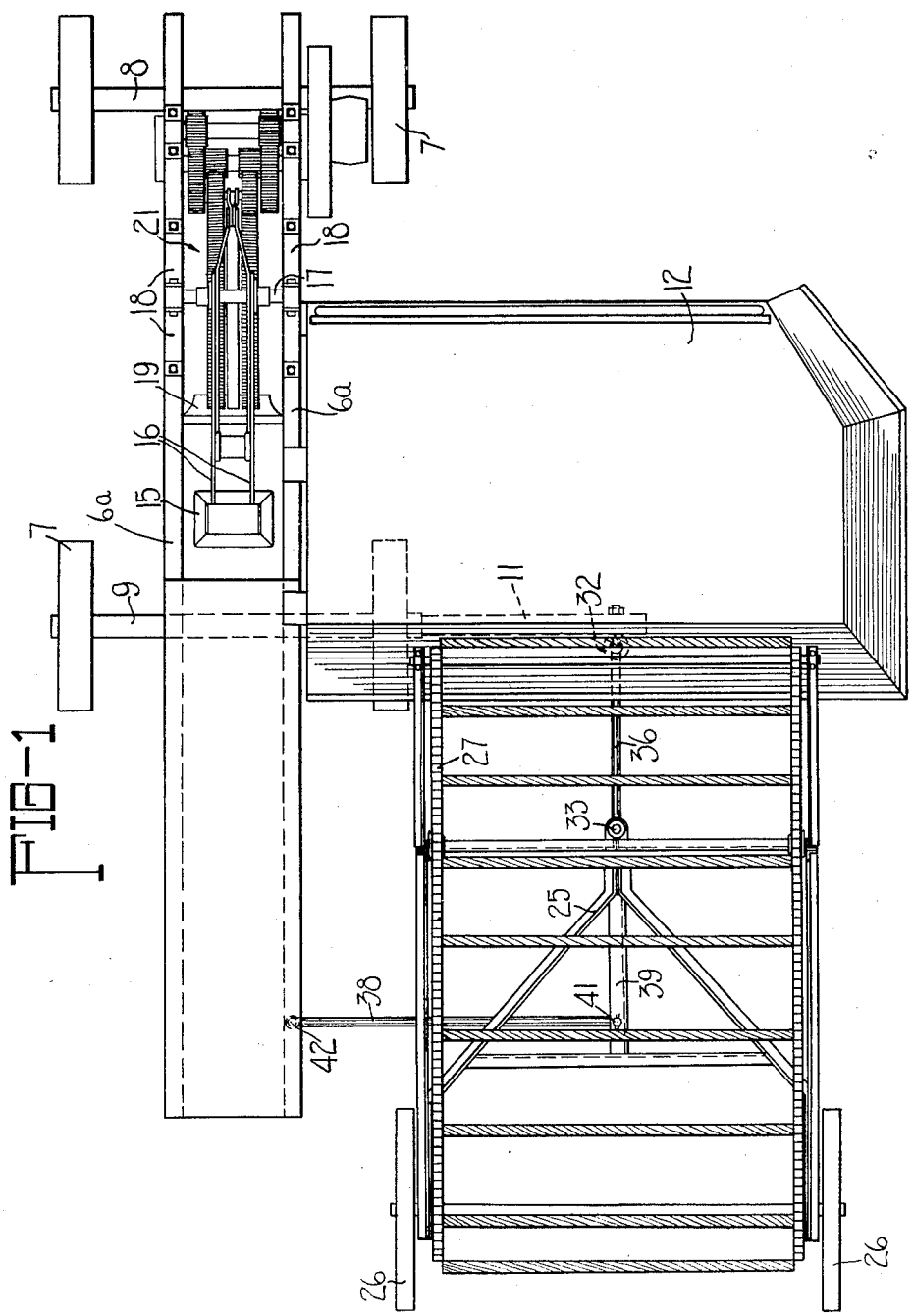

Patented Apr. 3, 1934

1,953,235

UNITED STATES PATENT OFFICE 1,953,235

HITCH DEVICE

George N. Kelley, Ottumwa, Iowa, assignor to Dain Manufacturing Company of Iowa, Ottumwa, Iowa, a corporation of Iowa Application November 11, 1932, Serial No. 642,202

5 Claims. (Cl. 280—33.44)

My invention relates to hitch devices for interconnecting implements, and the principal object of my invention is to provide an improved hitch for interconnecting two implements in lateral spaced relationship which permits one implement to have a limited relative angular movement with respect to the other to facilitate turning, meanwhile maintaining the two implements in proper spaced relationship for proper operation.

Another object of the invention is to provide an improved hitch especially adapted for connecting a loader beside a baling press with the delivery end of the loader disposed over the feed table of the baling press, the hitch permitting the loader to have a limited angular movement with respect to the press to facilitate turning the two implements together but not permitting the loader to take a position with respect to the baling press in which the loader will no longer discharge upon the feed table of the baling press, nor permitting the loader to swing to a position where it will collide with the baling press.

Other objects and advantages of my invention will be apparent to those skilled in the art after a consideration of the following detailed description, taken in conjunction with the accompanying drawings wherein:

Figure 1 is a plan view of a baling press and hay loader, shown diagrammatically and illustrating my improved hitch by which the two are connected;

Figure 2 is a side elevational view of the implements shown in Figure 1;

Figure 3 is a diagrammatic view showing the relative position of the implements and hitch members when the implements are turned to the left; and, Figure 4 is a diagrammatic view showing the relative position of the implements and hitch members when the implements are turned to the right.

The baling press illustrated in the drawings comprises the usual frame 5 having parallel upper angle bars 6a and lower angle bars 6b. The frame 5 is supported on wheels 7 which are journaled on front and rear axles 8 and 9. The front axle 8 is pivotally attached to the front end of frame 5 and is turned by means of a tongue, not shown, to guide the implement. The rear axle 9 is rigidly attached to bars 6b of frame 5. A feed table 12 is supported on frame 5 and extends laterally to one side of the baling press. The feed table 12 is suitably braced by means of braces 13 which incline downwardly from the outer end of table 12 and are connected to bar 6b of frame 5.

The material to be baled is fed into the baling chamber by means of a feeder head 15 which is disposed above the baling chamber and is supported on a pair of vertically oscillating arms 16 secured to a transverse rock shaft 17 supported above the frame bars 6a on supporting arms 18. A plunger 19 is positioned within the main frame and is movable longitudinally thereof to compress the material into a bale. Upon the forward portion of frame 5 is mounted gearing 21 of any suitable arrangement for actuating the plunger and feeder head. The preferred form of gearing, such as is shown in the drawings, and the driving means therefor are described in Patent No. 1,205,949 issued to James C. Thomas, November 21, 1916.

The hay loader comprises the usual frame 25 supported at its rear end on a pair of wheels 26, and at its front end on the outer end of a member 11 extending laterally from and fixed to the end of axle 9 by a draft device 28. Draft device 28 is pivotally connected to frame 25 and member 11 and permits relative movement of the implements when making a turn in either direction. The draft device 28 comprises a substantially horizontal draft bar 29 having a hook 31 formed on its forward end and engaging an eye 32 which is secured to the rear side of member 11 adjacent the outer end thereof. A vertical spindle 33 is provided at the rear end of draft bar 29 and is journaled in aligned bearing brackets 34 secured on the front side of frame 25. The vertical spindle 33 is retained against displacement by means of collars 35 which are secured thereon adjacent the opposite sides of bearing brackets 34. The draft device 28 is braced against draft strain by means of a diagonally extending brace bar 36 which is secured to the forward end of draft bar 29 and to the upper end of vertical spindle 33.

To limit the amount of lateral swinging movement of the loader relative to the baling press and to prevent the loader from colliding with the baling press when negotiating a sharp turn toward the left and also to maintain the delivery end of the hay loader within such a range that the hay will be delivered onto feed table 12 when the implements are turned in either direction, a spacing bar 38 is provided between the implements. One end of bar 38 is pivoted at 41 on frame bar 39 of the hay loader and the opposite end is pivoted at 42 on the adjacent bar 6b of frame 5 of the baling press. Bar 38 is of such length that when the implements are operated straight ahead, the hay loader is permitted to trail directly behind feed table 12 in parallel relation to frame 5 of the baling press. In this relative position of the implements bar 38 is under neither tension nor compression. The hay or other material to be baled is conveyed upwardly by the loader and is deposited upon feed table 12 from which it is fed into the baling chamber by hand, or preferably by an endless conveyor of a type for example as is described in the co-pending application of Frank D. Jones, Serial Number 633,674, filed September 19, 1932.

Turning toward the left causes the rear end of the loader to swing laterally toward the baling press, but it is restrained against colliding with the baling press by means of bar 38 acting in compression. When turning toward the right the rear end of the loader swings in the opposite direction, or away from the baling press. An excessive amount of shifting in this direction would result in the delivery end of the hay loader swinging out of the range of delivery to feed table 12 and thereby cause a quantity of hay to drop upon the ground. The bar 38, acting in tension, serves to limit the shifting of the implements in this direction so that the delivery end of the hay loader is maintained within the range of delivery to the baling press. By the use of bar 38, therefore, the implements are restrained against contacting with each other and the delivery end of the hay loader is limited to a range of movement within the sides of feed table 12.

While I have shown my improved hitch as applicable to a hay loader and hay press, it should be understood that it is not limited to this specific combination of implements, but may also be employed to connect any similar two wheeled vehicle in trailing relation beside another implement.

What I claim, therefore, and desire to secure by Letters Patent is:—

1. A hitch for interconnecting two implements in lateral spaced relationship including a longitudinally disposed draft link pivoted at one end to the forward end of the first implement and at the other end to the second implement for transmitting draft from the second implement to the first implement the pivotal connections being such that said link may swing in a horizontal plane relative to both implements, and a transversely disposed spacing bar pivoted at one end to the rearward end of the second implement and at the other end to the first implement at a point spaced rearwardly of the point of connection of said draft link with the first implement.

2. A hitch for interconnecting two implements in lateral spaced relationship including a longitudinally disposed draft link pivoted at one end to the forward end of the first implement and at the other end to the second implement for transmitting draft from the second implement to the first implement, and a transversely disposed spacing bar pivoted at one end to the rearward end of the second implement and at the other end to the first implement at a point spaced rearwardly of the point of connection of said draft link with the first implement, the pivotal connection of said draft link with one of the implements permitting movement of the link with respect to the implement in two directions and the pivotal connection of the draft link with the other implement permitting movement of the link with respect to the implement in a horizontal plane but preventing movement of the link with respect to the implement in a vertical plane whereby the front end of the first implement is supported on the second implement.

3. The combination with a baling press having a feed table extending laterally from one side thereof and a loader positioned to trail behind said feed table and comprising a frame and a pair of spaced non-dirigible supporting wheels near the rear of said frame, of a draft link connecting said loader to said baling press, said link being pivotally connected at one end to said frame and at the other end to said baling press the pivotal connections being such that said link may swing relative to the baling press and the frame in a horizontal plane, and a spacing bar pivotally connected to said baling press and to said frame forwardly of the axis of the wheels and rearwardly of the point of connection of said draft link with said frame, said bar being capable of transmitting either a tension or compression stress.

4. The combination with a baling press having a feed table extending laterally from one side thereof, and a loader positioned rearwardly of said feed table and having its delivery end in overhanging relation thereto, said loader comprising a frame, supported at its rear end on laterally spaced non-dirigible wheels, of a draft link connecting said loader to said baling press, said link being pivoted at its front end to said baling press for movement with respect thereto in two directions and at its rear end to said frame through a vertically disposed elongated bearing whereby said link serves to support the front end of said frame on the baling press but may swing relative to the frame in a horizontal plane, and a spacing bar pivotally connected to said baling press and to said frame forwardly of the axis of the wheels, said bar and draft link serving to maintain the delivery end of the hay loader over said feed table when the implements are turned in either direction.

5. The combination with a baling press having front steering wheels and rear supporting wheels journaled on an axle and a feed table extending laterally from one side thereof, and a loader positioned in trailing relation rearwardly of said feed table, said loader comprising a frame supported at its rear end on laterally spaced wheels, of a pair of vertically spaced bearing brackets secured on the front end of said frame, a member fixed to and extending laterally from the end of said axle below said feed table, a draft link connecting said loader to said baling press, said link comprising a forwardly extending draft bar pivotally connected at its front end to said laterally extending member, a vertical spindle on the rear end of said draft bar journaled in said bearing brackets, and a spacing bar between said baling press and said frame for limiting the lateral movement of said loader relative to said baling press.

GEORGE N. KELLEY.